Oct. 13, 1970   R. L. HIRSCH   3,533,910
LITHIUM ION SOURCE IN APPARATUS FOR GENERATING FUSION REACTIONS
Filed Jan. 18, 1968   3 Sheets-Sheet 1

INVENTOR.
ROBERT L. HIRSCH,
BY *Hood, Gust & Irish*
ATTORNEYS.

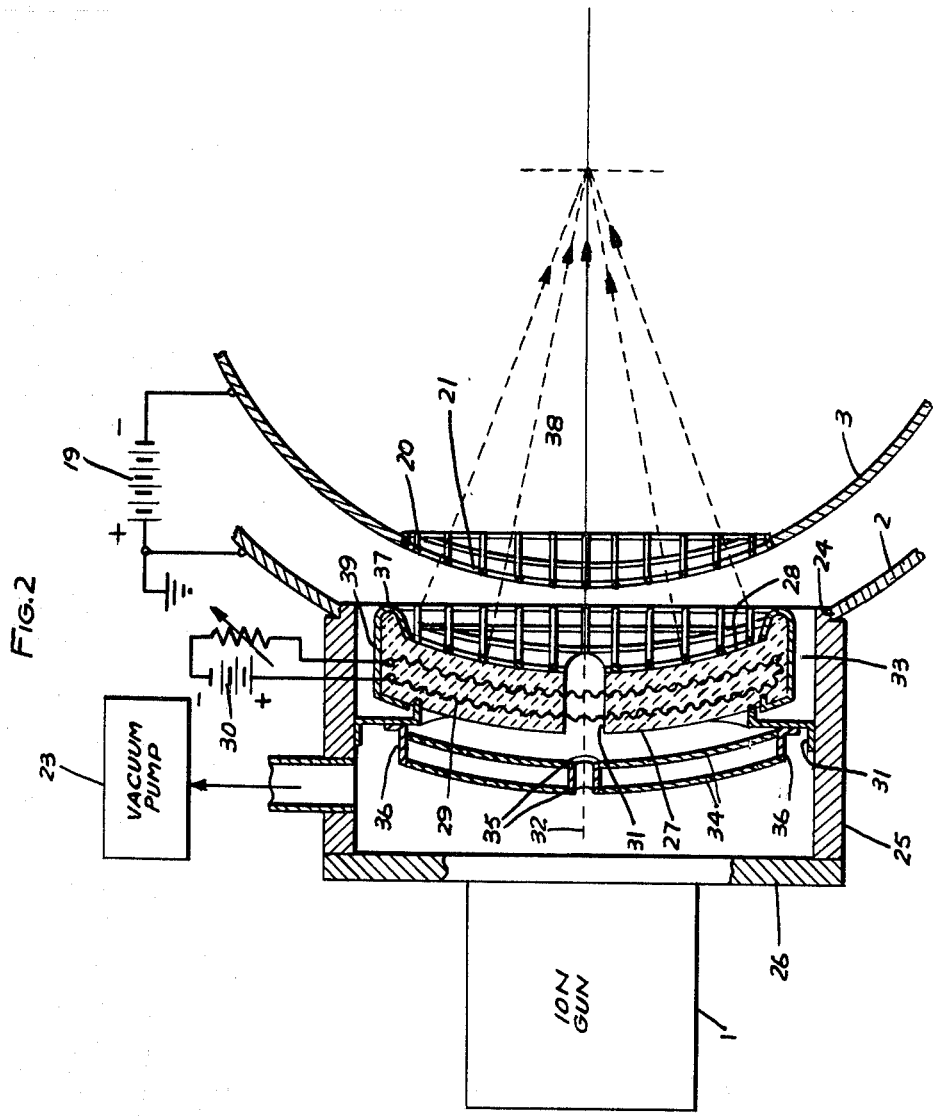

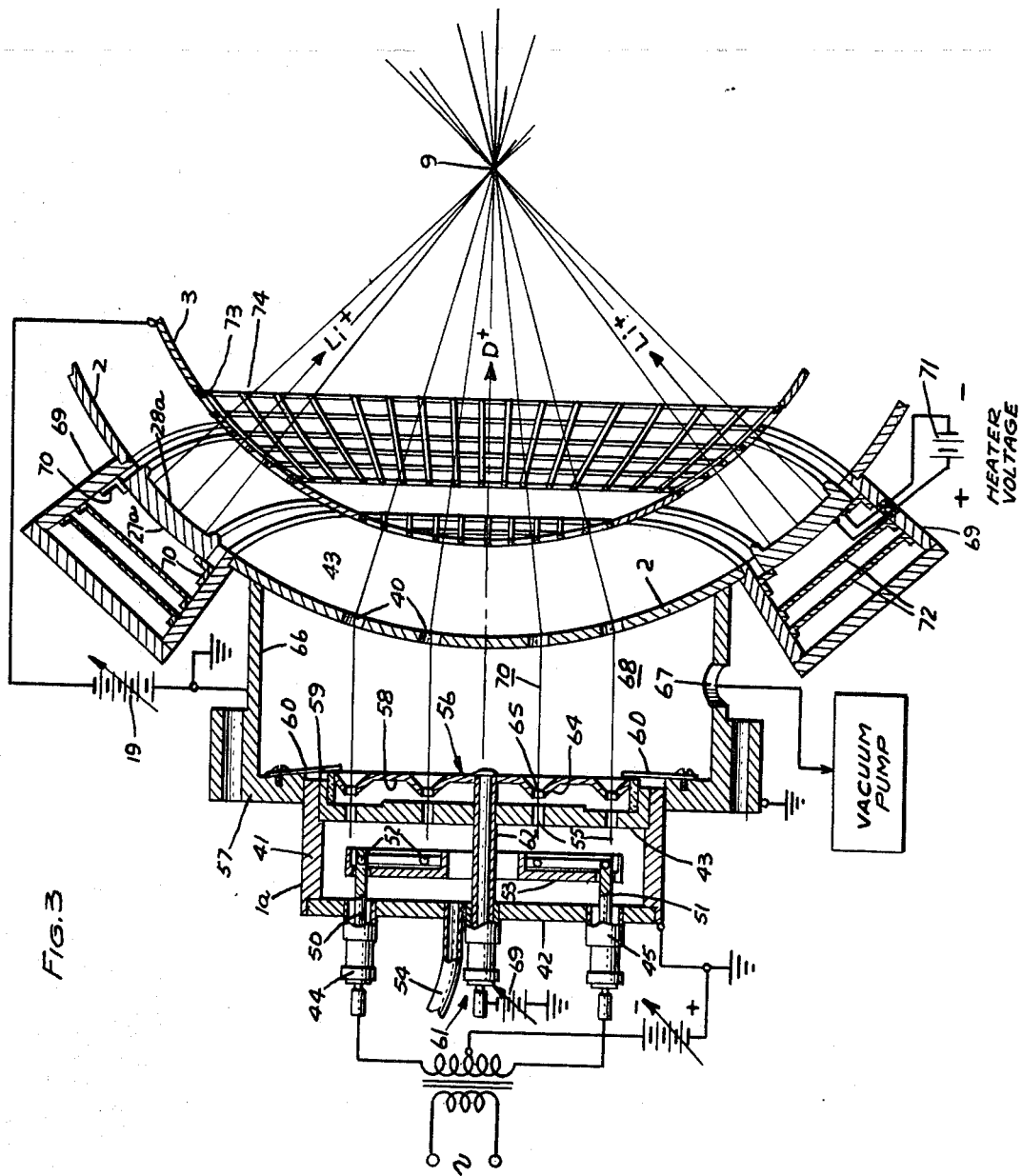

United States Patent Office 3,533,910
Patented Oct. 13, 1970

3,533,910
LITHIUM ION SOURCE IN APPARATUS FOR
GENERATING FUSION REACTIONS
Robert L. Hirsch, Fort Wayne, Ind., assignor to International Telephone and Telegraph Corporation, Nutley,
N.J., a corporation of Delaware
Filed Jan. 18, 1968, Ser. No. 698,867
Int. Cl. G21b 1/02
U.S. Cl. 176—1                 14 Claims

ABSTRACT OF THE DISCLOSURE

A spherical anode has concentrically positioned therein a spherical cathode permeable to charged particle flow. The cathode is hollow and defines a volume centrally located with respect to both the anode and the cathode. This volume is free of tangible structure. A fusion-reactive gas contained within the volume includes ions of lithium and hydrogen or hydrogen isotopes. A plurality of ion-producing devices are mounted on the exterior of the anode and are spherically spaced and diametrically aligned in pairs for injecting hydrogen (or isotopes thereof) ions, at fusion-reactive energies, toward the center of the cathode. Additionally, there are generalized, spherically spread sources of lithium ions about the anode such that ions emanating therefrom may be accelerated toward the center and become a part of the aforementioned fusion-reactive gas. All of the ions are focused toward the center such that upon achieving a high enough density at the center, fusion reactions will be produced between the lithium and hydrogen (or isotopes) ions.

BACKGROUND OF THE INVENTION

Field of the invention

This invention relates to apparatus for producing nuclear-fusion reactions, and more particularly to the provision of a source of lithium ions in an apparatus for producing controlled nuclear-fusion reactions.

Description of the prior art

In Farnsworth Pat. No. 3,258,402, issued on June 28, 1966, in Farnsworth Pat. No. 3,386,883, issued on June 4, 1968 on application Ser. No. 549,849, filed May 13, 1966, and also in Hirsch application Ser. No. 691,049, filed Dec. 15, 1967, entitled "Improvements in Apparatus for Generating Fusion Reactions," there are disclosed methods and apparatuses of the character with which the present invention is concerned, these being capable, to varying degrees, of producing continuous fusion reactions. Generally speaking, the apparatuses of these prior patents utilize spherical geometry in which two generally spherical electrodes, one a cathode and the other an anode, are concentrically positioned one inside the other. In operation, an electrical discharge, composed of high-order. In operation, an electrical discharge, composed of high-order magnitude electron and ion currents in the space enveloped by the cathode, produces a radial potential distribution which, generally speaking, is a minimum adjacent to the center of the cathode cavity and a maximum outwardly therefrom. These potential phenomena have been heretofore characterized as virtual electrodes, the one corresponding to the minimum potential being a virtual cathode and the maximum potential being a virtual anode. By developing a sufficiently high difference of potential between the virtual anode and the virtual cathode (the center), trapped ions will be propelled at nuclear-reacting energies, so that ion collisions occurring at the center produce fusion reactions.

In the apparatus of the aforesaid Farnsworth Pat. No. 3,258,402, ions are obtained in one instance by ionizing neutral gas introduced directly into the anode itself. In another instance, the ions are produced by ion guns located on the exterior of the anode, these ions being projected toward the center of the device. In the aforesaid Hirsch application Ser. No. 691,049, ions are injected into the anode interior from the outside thereof by means of distributed sources which, generally speaking, subdivide a source of ions into a multiplicity of tiny streamlets which are injected into the anode interior over an extended area of the anode itself in contrast with a localized or spot area which ordinarily would receive a concentrated, pencil-like beam of ions.

Experimental evidence has shown that the more nearly radial the ion motions, the more efficient will be the utilization of the ions in achieving fusion reactions. One theoretical method of producing radial motions is to provide an ion source which covers the entire inner surface of the anode. With ions emanating from all points on the inner spherical surface of the anode, space charge spreading can be minimized such that the ions will follow radial paths and cross at the center.

The present invention approaches this idealized construction such that in a practical, working embodiment of this invention, maximum utilization of the total number of ions is achieved.

SUMMARY OF THE INVENTION

In accordance with the broader aspects of this invention, there is provided an apparatus (sometimes referred to as a "fusor") for generating fusion reactions in which a spherical anode concentrically envelops a spherical cathode which in turn encloses a volume free of tangible structure. The cathode is open to the flow of gaseous particles therethrough but is substantially impervious to the flow of electrons. Means are provided for applying a potential to the anode and cathode for establishing an electric potential therebetween of sufficient magnitude as will impart fusion-reactive energies to positively charged particles introduced at the anode into the space between the anode and cathode. Means are provided for introducing ions of hydrogen or an isotope thereof into the interelectrode space at the anode. An extended area source of lithium ions is disposed on the inner side of the anode and the adjacent portion of the cathode is permeable to the lithium ions in the portion thereof which is in radial alignment between the source and the cathode center. Lastly, means are provided which include the anode and cathode for focusing all of the charged particles toward the center where fusion-reactions are produced.

OBJECTS OF THE INVENTION

It is an object of this invention to provide in an apparatus for producing fusion-reactions a generalized, spherically disposed solid-state source of ions which may be directed along radii of a sphere toward the center thereof.

It is another object of this invention to provide an apparatus for producing fusion-reactions elements capable of emitting ions of lithium over generalized, part-spherically spread areas, these ions being capable of being focused toward the center of the spherical geometry where they may react with ions of hydrogen or an isotope thereof.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a fragmentary diametral cross-section of one portion of this embodiment; and FIG. 3 is a similar sectional view of another embodiment of this invention.

DESCRIPTION OF THE PREFERRED EMBODIMENT

Figure 1:
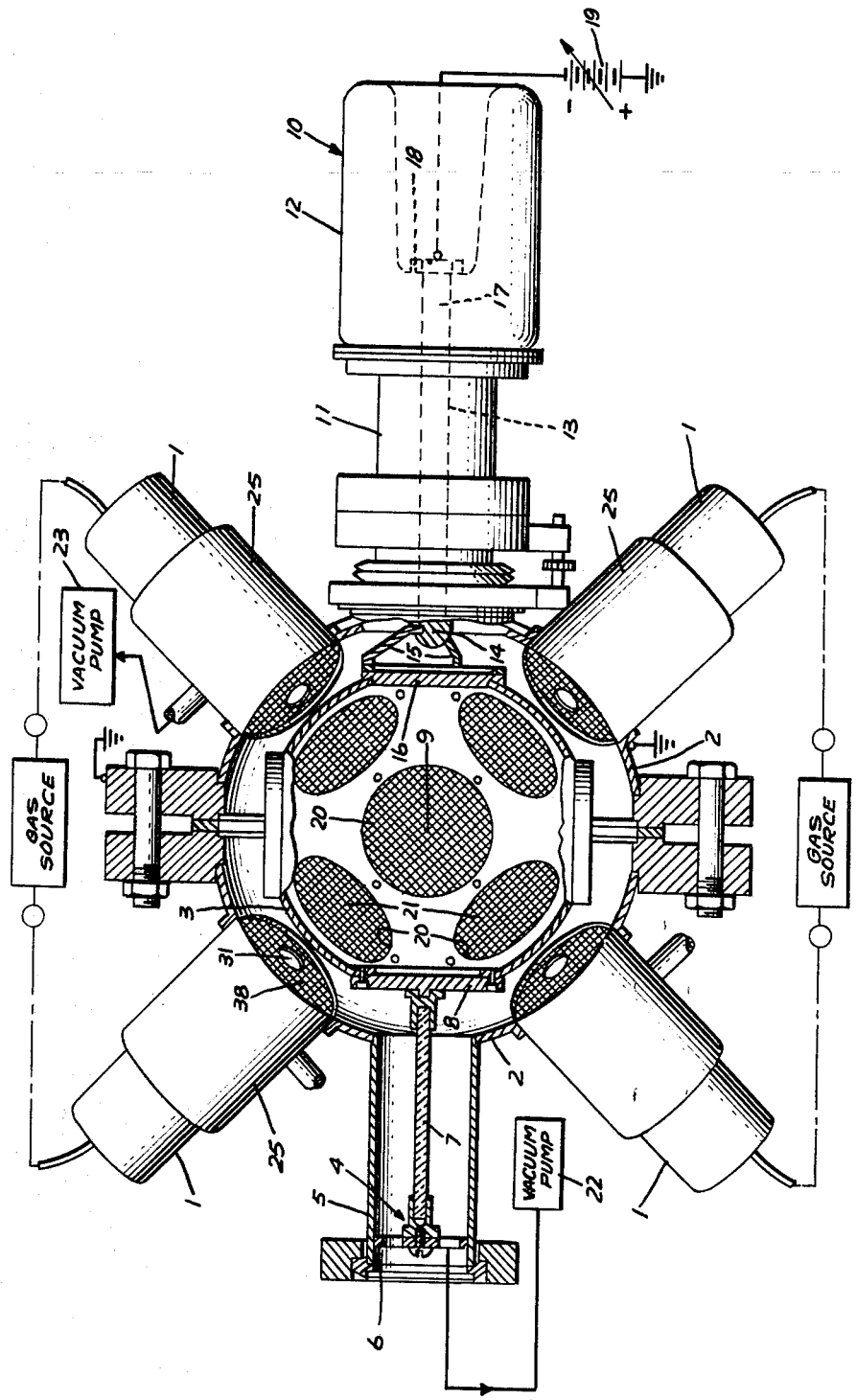
FIG. 1 is a partially sectioned illustration of an embodiment of this invention.

Referring to FIG. 1, eight (8) ion guns 1 are used, these being arranged in diametrically opposite pairs symmetrically around the surface of a spherical anode shell 2. A cathode shell 3 is mounted in concentric relation with respect to the anode 2 by means of a pedestal assembly indicated generally by the reference numeral 4. This assembly 4 includes a stainless steel supporting tube 5 secured at one end to anode 2 as shown. An apertured disc 6 is fastened inside tube 5 in the position shown and has secured thereto a ceramic post 7 which projects coaxially through tube 5 to a position just inside anode 2. The opposite end of the ceramic post 7 is secured to a mounting plate suitably, rigidly secured to cathode shell 3. All of the parts just described are sufficiently strong and rigid to position securely the cathode 3 with respect to the anode 2.

The left-hand end of tube 5 is adapted to have a vacuum pump connected thereto. The ion guns 1 may be of a conventional design adapted to form a columnated beam of ions which may be injected into the anode 2 toward the center 9 thereof which is also common to the cathode 3. Suitable ion gun structures are disclosed in the preceding Farnsworth and Hirsch patents.

A high voltage terminal assembly indicated generally by the numeral 10 comprises a conductive tubular assembly 11 capped at its right-hand end as shown with a bottle-like insulator 12 which is sealed in vacuum-tight relation to the tubular assembly 11. Extending coaxially through the assembly 11 and insulator 12 is a rod-like electrode 13. The inner end 14 of electrode 13 has rigid conductors 15 connected to a mounting plate 16 secured to the cathode 3 as shown. The opposite end 17 of electrode 13 penetrates in vacuum-sealed relation the re-entrant end wall portion 18 of insulator 12 to have connected thereto high voltage leads shown diagrammatically. These leads in turn connect to a high voltage source of power indicated by numeral 19, this source being capable of delivering voltages at values from 0 to 150 kilovolts.

All of the parts are sufficiently strong and rigid to center and secure cathode 3 within anode 2. The cathode 3 itself is consrtucted as a spherical, metallic shell having a series of relatively large apertures 20 covered by tungsten or tantalum wire screen 21 of relatively large mesh. These apertures 20 are in precise radial alignment with the respective ion guns 1 and are of a diameter as will become apparent from the description that follows. Further details regarding construction, materials, operating parameters and the like regarding the apparatus thus far described may be had by referring to the preceding Farnsworth and Hirsch patents, the disclosures thereof being included herein by reference.

In operation of the fusor, high voltage connections are made as previously explained and the ion guns 1 are set into operation, hydrogen gas or an isotope thereof, such as deuterium or tritium, being ionized by the guns 1 and formed into beams which are focused onto the center 9. The anode cavity is continuously evacuated by means of a vacuum pump 22 connected to the tubular assembly 15 and other vacuum pumps 23 which are connected to the ion guns 1. The cathode 3 is electron-emissive on its interior surface and is impermeable to electron flow. The anode 2 may be considered as a solid metallic shell impervious to the flow of gas.

With the pressure internally of the anode 2 and cathode 3 reduced to a low value of about $10^{-7}$–$10^{-9}$ torr and the ion beams from the guns 1 being focused onto the center 9, the ions in these beams being projected at fusion-reacting energies, collisions of these ions at the center 9 produce fusion reactions. This is fully and completely explained in the aforesaid Farnsworth patents.

Ideally, all of the ions in the various beams should follow paths which intersect at the precise center 9. However, since the beams have a finite cross-sectional dimension, only those ions in the central portions of the beams can follow paths which either intersect the center 9 or approach it closely enough to be instrumental in achieving fusion reactions. By reason of space charge spreading within the individual beams, as the various beams approach the center 9, the peripheral ions tend to spread outwardly and away from the center, thereby resulting in a loss thereof in connection with obtaining fusion reactions.

More precisely, in the creation of the conditions for achieving fusion reactions, not only are ions injected into the center 9 from the guns 1, but electrons from the cathode 3 are similarly directed toward the center 9. As a consequence, a negative potential well is developed at the center 9, and at a finite radial distance outwardly therefrom a potential maximum is produced. The potential minimum is characterized as a virtual cathode and the potential maximum as a virtual anode. Ions are trapped within the virtual anode and oscillate thereinside along diametral paths which intersect the center 9. The ions achieve fusion-reacting energies upon approaching the center 9, such that collisions therebetween will result in the production of fusion reactions.

It is important that the virtual cathode and anode system be formed and maintained, and to this end the more nearly radial the paths followed by the ions, the more efficiently will the virtual electrode system be produced in the first instance and maintained thereafter. Ideally, therefore, if the entire inner surface of the anode 2 were considered as a source of ions, and the cathode 3 were fully permeable to these ions, such ions would follow precisely radial paths which would intersect at the center 9. Therefore, each ion would contribute all of its energy to the formation and retention of the virtual electrode system, such that the ions would be utilized with maximum efficiency.

As explained previously, by reason of the space-charge spreading in the solid-cross-section beam emanating from the ion guns 1, it will be noted that the ions in the periphery of the beams will not be able to pass through the virtual anode and therefore cannot reach the center 9 where their probability of fusion is a maximum.

The probability of reaching the center is maximized by use of solid-state sources of lithium ions, as will now be described in connection with FIGS. 2 and 3. Referring to FIG. 2, like numerals will indicate like parts. Only one of a number of ion-producing devices is shown (eight in this embodiment), it being understood that all of such devices are identically constructed. Hermetically sealed to the anode 2 and closing an enlarged opening 24 in the anode 2 is a metallic housing 25 of tubular shape which extends outwardly from anode 2. An ion gun 1 is mounted on cap portion 26 of housing 25 and emits a pencil beam of ions toward the center 9 of the fusor, as previously described.

Disposed concentrically within housing 25 is a circular element 27 which, upon being heated, emits lithium ions. The element 27 is of "button-like" configuration and is provided with an inner surface 28 of the same spherical shape as the inner surface of anode 2. Preferably, surface 28 is an extension of the inner surface of anode 2 such that its curvature will be concentric about the center 9.

The basic material of the button 27 is spodumene (or some other suitable material), which is a glass-like material that emits lithium ions when heated above 900° C. Heating is provided by means of a resistive wire such as platinum that is imbedded in the spodumene button, this heater being indicated by numeral 29. An electrical current is passed through the heater 29, the power therefore being provided by means of a battery 30. For a more detailed discussion of the lithium ion emitter, reference may be had to a publication entitled "The Review of Scientific Instruments," vol. 37, No. 5, May 1966, on pages 607 and following.

A central aperture 31 is provided in the spodumene button 27 which is radially aligned with the ion beam, indicated by numeral 32, emitted by ion gun 1. The spodumene button 27 is secured in position by means of a number of small metal brackets 31 welded to the inner surface of housing 25 at circumferentially spaced points and otherwise welded or fused at the other ends thereof to the back side of the spodumene button 27. The spodumene button has an outer diameter smaller than the inner diameter of housing 25 so as to provide a definite circumferential clearance 33 therearound. The purpose of this clearance is to minimize heat transfer between the spodumene button 27 and the remaining structure of the fusor, this including the anode 2 and the housing 25.

Heat shields 34 are mounted between the rear of the spodumene button 27 and the cover 26 of the housing so as to further minimize heat transfer from the spodumene button 27 to the remaining structure. Two such shields are shown, each being in the form of spherically curved reflective, aluminum discs mounted in parallelism to each other and with respect to the curved back side of the spodumene button 27. The heat shields 34 are provided with apertures 35 in radial alignment with the aperture 31 in the spodumene button 27. A series of small mounting brackets 36 are used for edge mounting the heat shield 34 to the brackets 32 previously described. By reason of the reflective character of heat shield 34, transfer of heat by radiation from the spodumene button 27 to the cover 26 is effectively minimized.

A peripheral lip 37 is provided on the front side 28 of the spodumene button 27 as shown for a purpose which will be explained later on.

As explained earlier, the cathode 3 is provided with an opening 20 which is in registry with the spodumene button 27. Over this opening 20 is the screen 21 of tantalum or other suitable material. The screen 38 is superposed in intimate contiguous contact with the spodumene surface 28 as shown. The wire and mesh size of this screen 38 corresponds substantially to that of screen 21 but preferably is minutely larger. Screen 38 is positioned in precise radial registry with screen 21 such that the crossed wires of screen 38 are in line with the crossed wires of screen 21. Thus, all the openings in screen 38 are in precise radial registry with the openings in screen 21.

Securing screen 38 to the face 28 of the spodumene button 27 is a tantalum ring 39 which intimately encircles spodumene button 27 and clamps over the outer peripheral edge of screen 38 as shown. The rear portion of ring 39 is bent inwardly into suitable, tight fitting slots in the back side of spodumene button 27 as shown for securing ring 39 in position. Thus, any relative movement between ring 39 and spodumene button 27 due to thermal dimensional changes may be easily accommodated by the ring 39 as it is capable of changing shape slightly. Other methods of mounting the ring 39 on button 27 may be used without departing from the spirit and scope of this invention.

In operation, sufficient voltage from the source 30 is applied to the heater 29 of the spodumene button 27 to heat the latter to a temperature in excess of 900° C. The fusor is operated precisely as explained previously, the interior thereof being evacuated to a pressure of about $10^{-7}$ to $10^{-9}$ torr. Lithium ions emitted from the front surface 28 of the spodumene button 27 are accelerated by the electric field in the anode-cathode space toward the center 9, and since these lithium ions will only be emitted in areas in precise radial registry with the openings in the cathode screen 21, only a minimum number of these ions will ever impact the screen. The screen 38 serves as a mask in minimizing ion bombardment of the screen 21. Deuterium or hydrogen ions developed in the ion gun 1 and formed into an ion beam 32 are directed through the apertures 35 and 31 in the heat shield and spodumene button, respectively, toward the center 9. The virtual electrode system forms as previously explained thereby produce a dense concentration of charged particles in and around the center which can react. Typical fusion reactions which may be realized are as follows:

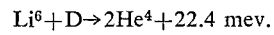

$$Li^6 + D \rightarrow 2He^4 + 22.4 \text{ mev.}$$

$$Li^7 + H \rightarrow 2He^4 + 17.3 \text{ mev.}$$

Inasmuch as the lithium ions emanate from a generalized, part-spherically spread surface, almost all of the ions will follow nearly precise radial paths toward the center 9, thereby resulting in the near total utilization thereof in the formation of the virtual electrode system as well as in the contribution to the fusion reactions. By making the spodumene button 27 as large as possible, it is seen that a more efficient source of lithium ions can be provided.

While tantalum has been specified as the material of the screen 38, any material which will not react with the spodumene button 27 and otherwise will prevent emission of lithium ions in the solid portions thereof may be used.

A slightly different embodiment of this invention is illustrated in FIG. 3, in which the spodumene element is made somewhat larger than the one in FIG. 2 and in annular shape instead of one that is button-like. An additional difference resides in the ion gun construction, the one in FIG. 3 providing deuterium or hydrogen ions which are injected over an extended area of the anode surface instead of in the form of a pencil beam as is true in FIG. 2. In the embodiment of FIG. 3, like numerals indicate like parts. The ion gun for producing ions of hydrogen or an isotope thereof is indicated by reference numeral 1a. In the region of the ion gun 1a, the anode 2 is solid with the exception of a series of ion-transmitting apertures 40 spaced over an extended area thereof as shown. The ion gun 1a is disclosed in detail and claimed in Hirsch-Meeks application Ser. No. 585,901, filed Oct. 11, 1966, and entitled "Ion Gun Improvement." The disclosure of this Hirsch-Meeks application may be considered as being included herein by reference. Also, Hirsch application Ser. No. 691,049, filed Dec. 15, 1967, previously mentioned herein, discloses this same ion gun used in connection with a fusor. This disclosure is also included herein by reference. Briefly described, the ion gun 1a includes a hermetically sealed envelope in the form of a tubular anode 41 having opposite end closures 43 and 42 as shown. The end closure 42 consists of a suitably strong metallic plate sealed to the left-hand end of anode 41 and provided with feedthrough insulators 44 and 45 which mount two conductive supporting bars 50 and 51 as shown. The mounting of these supporting bars 50 and 51 within the insulators 44 and 45 is conventional and is suitably rigid for supporting thermionic electron emitters 52 on the inner ends thereof. Conductively connected to the end of the bar 51 and rigidly supported thereby is a metal cup 53 annular in shape having a flat bottom and tubular inner and outer walls. The emitters 52 are circular and are coaxially fitted within the cup 53 as shown. The cup 53 is coaxially mounted with respect to the anode 41 and is suitably radially spaced therefrom as shown. Its purpose is to inhibit electron motion to the rear of the chamber and to provide a degree of electrostatic focusing of the discharge.

In the end plate 42 is an opening into which is fitted a gas-inlet tube 54 leading from a suitable supply of fusion-reactive gas such as hydrogen, deuterium or tritium, or a combination thereof. A valve may be connected in series with tube 54 for controlling manually the amount of gas flowing into the interior of anode 41.

The closure 43 is in the form of a metal plate sealed at its perimeter to and conductively connected to anode 41 and provided with a plurality of laterally spaced apertures 55.

Clamped onto the right-hand end of anode 41 and hermetically sealed thereto is an extractor assembly indicated generally by numeral 56. This assembly includes a metallic mounting ring 57 to which is assembled an extractor plate 58. Plate 58 is positioned in parallelism with the end plate 43 by means of a tubular member 59 of insulating material closed at its left-hand end by plate 43 and on the right-hand end by plate 58. At diametrically opposite points on the outer peripheral portion thereof, plate 58 is engaged by a number of brackets 60 of insulating material fixedly attached to the end assembly 56. Thus, plate 58 is held rigidly in position and furthermore is insulated from the anode 41. A conventional feedthrough insulator 61 is sealed hermetically to the end closure 42 and axially penetrates the entire assembly to be connected to plate 58. This feedthrough insulator 61 includes a sleeve 62 of insulating material and has a central conductor 63 conductively connected at the right-hand end to the plate 58. By means of this feedthrough insulator 61, the necessary supply voltage may be coupled to plate 58.

As an integral part of the extractor plate 58 there are a multiplicity of ion-extracting electrodes 64. Each of the electrodes 64 is conical in shape and has an aperture 65 in registry with the respective aperture 55 in plate 43. Apertures 55 and 65 preferably are circularly arranged around a common axis, but other patterns may be used without departing from the spirit and scope of this invention. Fitted between ion gun 1a and anode 2 is a tubular, conductive envelope 66. This envelope 66 is secured and sealed at its left-hand end to mounting ring 57, this mounting ring being hermetically and conductively secured to anode 41. At its right-hand end, envelope 66 is hermetically and conductively secured to anode 2 as shown. An opening 67 is adapted to be connected to a vacuum pump, as shown, for evacuating chamber 68 within envelope 66. Chamber 68 is defined at its periphery by the envelope 66 and at its opposite ends by the extractor plate 58 and the outer surface of anode 2. It should be noted that apertures 40 are in substantial alignment with the aperture pairs 55, 65 such that parallel straight lines drawn as shown will intersect all three apertures 55, 65, 40.

The element 27a, emissive of lithium ions upon being heated and which may be of spodumene, is of annular shape and positioned in the anode 2 to concentrically surround the envelope 66. The inner surface 28a of element 27a is spherically curved in conformance with the inner curvature of anode 2, and the edges of element 27a are spaced inwardly from anode 2 so as to provide a heat-insulating clearance therewith. A hermetically sealed housing 69 is mounted on anode 2 over the element 27a as shown, this housing 69 being constructed substantially identical to the housing 25 in FIG. 2 with the exception that the housing 69 is annular instead of tubular. Element 27a is mounted in position rigidly by means of a series of small, conductive angle brackets 70 fastened at one side to the wall of housing 69 and at the other side to the rear of element 27a. Element 27a is fitted with a heater the same as described in connection with FIG. 2, a source 71 of voltage providing the heater current. Heat shields 72 of the same materials as those already described in connection with FIG. 2 are secured to the walls of the housing 69 in position between the element 27a and the rear of the housing 69.

The cathode 3 in radial registry with the lithium-emitting element 20a is provided with an annular opening 73 covered by screen 74 as shown. The surface 28a of the element 27a may be provided with a similar screen or mask as previously explained in connection with the element 27 of FIG. 2.

In operation, a high voltage potential is applied between the cathode 3 and anode 2 as shown. The assembly is evacuated by operation of the vacuum pump connected to opening 67 and to the opening 6 (FIG. 1) on the anode. At the proper time, measured amounts of fusion-reactive gas are admitted into the ion gun 1a via inlet line 54. Potentials are coupled to the ion gun as shown. A suitable filament supply is connected to the cathodes 52 and a biasing battery is connected between the anode 41 and the filament circuit as shown. Thus, the anode 41 is at a positive potential with respect to filaments 52; however, it is at the same ground potential as anode 2. The extractor plate 58 is biased to a negative voltage with respect to ground by means of a battery 69.

The filaments 52 being heated, they emit electrons which are attracted to anode 41. As viewed in FIG. 3, the electrons will be projected toward the right by reason of the attractive force of the field set up between the filaments 52 and the plate 43. Inasmuch as cup 53 is at the same potential as filament 52, it will be obvious that the forces acting on the electrons emitted by the filament will cause rightward movement thereof.

Electrons flowing from filaments 52 to plate 43 along various paths collide with neutral gas particles introduced via the tubulation 54.

The extractor plate 58, being negative with respect to anode 41, will provide a field which reaches into the plasma resulting from the ionization process and withdraws ions therefrom. Further, this field concentrates the ions through the orifices 55 and directs them through the respective apertures 65. The shape of the field is such that the ions are formed into a multiplicity of pencil-like beams having sizes and shapes corresponding to those of the respective apertures 55 and 65. Thus, the end plate 43 with its apertures 55 and extractor plate 58 with its apertures may be regarded as an ion-lens assembly which forms the ions into a plurality of small ion beams which are accelerated along the paths parallel to each other rightwardly into evacuated chamber 68. In a typical operating embodiment of this invention, anode 41, 43 may be operated within a range of from 50 to 200 volts positive with respect to filaments 52.

The beams emanating from apertures 65 are directed across chamber 68 where they penetrate apertures 40 at a relatively low velocity. The field between cathode 3 and anode 2 acts thereon and provides a focusing and accelerating force which converges the ions toward the center 9.

Upon heating the lithium-emitting element 27a, it emits lithium ions from the entire surface thereof, these ions also encountering the anode-cathode field which focuses and accelerates them toward the center 9. The virtual electrode system is formed and the fusion reactions result as explained previously. By reason of the ions being introduced into the anode-cathode space over a substantial area of anode 2, they follow paths toward the center which are nearly precisely radial, thereby minimizing the effects of the transverse fields which in the pencil beam of solid cross-section causes lateral spreading thereof. As explained in the aforesaid Hirsch patent, by spreading the ions over a substantial area of the anode prior to low velocity injection thereinto, the individual ion beams directed toward center 9 will be of correspondingly low current and will thereby experience less spreading than is true of the case of the high current beam of solid cross-section. By reason of the ions following almost precisely radial paths, they are utilized with maximum effectiveness in establishing the necessary virtual electrode system and in producing fusion reactions. The lithium-emitting material is of special significance inasmuch as it is capable of emitting ions over a generalized, spherically spread surface which results in the production of a large number of low current beams of ions in sharp contrast with the high current, cross-sectional beams explained earlier.

While there have been described above the principles of this invention in connection with specific apparatus, it is to be clearly understood that this description is made only by way of example and not as a limitation to the scope of the invention.

What is claimed is:

1. Improvements in apparatus for generating fusion reactions, comprising anode means, cathode means inside and spaced from said anode means, said cathode means defining a volume centrally located with respect to both said anode and cathode means, said volume being free of tangible structure, said cathode means being open to the flow of ionized gaseous particles therethrough, means for applying a potential to said anode and cathode means for establishing an electric potential therebetween of sufficient magnitude to impart fusion-reactive energies to positively charged particles introduced in the space between said anode and cathode means, means for introducing ions of hydrogen or an isotope thereof into the space between said anode and cathode means, an extended area source of lithium ions disposed in the region between said anode and cathode means, said cathode means being permeable to said lithium ions in the portion thereof which is in radial alignment between said source and a common point with said volume, and means including said anode and cathode means for focusing said charged particles and lithium ions toward said common point in said volume.

2. The apparatus of claim 1 in which said source includes lithium carried by said anode means, and means for heating said lithium to an extent sufficient to cause the emission of lithium ions therefrom.

3. The apparatus of claim 2 wherein said anode means is a generally spherical metallic shell concentrically surrounding said cathode means which is also a generally spherical metallic shell, said lithium being in the form of a plurality of segments having surfaces facing toward said common point.

4. The apparatus of claim 3 in which said lithium is electrically conected to said anode shell so as to be at the same potential.

5. The apparatus of claim 4 including means for retarding the transfer of heat from said lithium to said anode shell.

6. The apparatus of claim 5 in which said retarding means includes hermetically sealed housing means on said anode shell which encloses said lithium segments, said lithium segments being spaced from said anode shell to thereby minimize heat transfer thereto, and means for supporting said lithium segments from said housing means.

7. The apparatus of claim 6 in which said anode shell has a plurality of openings therein in which said lithium segments are positioned and said housing means hermetically sealing the last-mentioned openings.

8. The apparatus of claim 7 in which said lithium segments have electrical heaters therein, said hydrogen ion-introducing means including an ion gun mounted on at least one of said housings and being positioned to direct ions toward the center of said cathode shell and an ion-receiving aperture in the lithium segments enclosed by said one housing whereby ions emitted by said gun may be directed through said ion-receiving aperture toward said center.

9. The apparatus of claim 8 in which the inner surfaces of said lithium segments have curvatures corresponding to segments of a sphere having the same center as said anode and said cathode shell, and heat-shield devices interposed between the outer surfaces of said lithium segments and the adjacent portions of the respective housing and ion guns.

10. The apparatus of claim 9 in which the respective portions of said cathode shell radially opposite said lithium segments are open and provided with a conductive field-defining matrix having ion-receiving apertures and means on the inner surface of each segment for limiting the emission of ions therefrom to regions which are radially registered with the apertures in said matrix.

11. The apparatus of claim 10 in which said matrix is a first metallic screen and said limiting means is a second metallic screen of slightly larger mesh size as said first screen, said second metallic screen being of a material which does not interact with the material of said lithium segments nor emit ions during the emission of the aforesaid lithium ions.

12. The apparatus of claim 6 in which said lithium segments are of annular shape and have inner surfaces shaped as segments of a sphere having the same center as said anode and cathode shells, said ion-introducing means including ion guns on said anode shell in such position as to be encircled by said respective ones of said annular segments.

13. The apparatus of claim 12 in which each ion gun includes means for forming multiple ion beams and introducing them into the space between said anode and cathode shells over an extended area of said anode shell.

14. The apparatus of claim 4 in which the inner surfaces of said lithium-emitting segments have peripheral lips thereon which extend radially inwardly toward the center of said anode and cathode shells, said lips constituting part of said focusing means for focusing lithium ions emitted from said inner surfaces toward said center.

References Cited

UNITED STATES PATENTS

| | | | |
|---|---|---|---|
| 3,258,402 | 6/1966 | Farnsworth | 176—1 |
| 3,303,097 | 2/1967 | Mallinckrodt | 176—8 X |
| 3,345,524 | 10/1967 | Kidwell | 176—1 X |
| 3,386,883 | 6/1968 | Farnsworth | 176—1 |

REUBEN EPSTEIN, Primary Examiner

U.S. Cl. X.R.

176—8, 2; 313—61; 315—111